United States Patent
Krzoska et al.

(10) Patent No.: US 7,267,313 B2
(45) Date of Patent: Sep. 11, 2007

(54) RETAINING DEVICE FOR THE FLOATING MOUNTING OF A FLAT SCREEN AND ELECTRONIC DISPLAY DEVICE COMPRISING A FLAT SCREEN AND A RETAINING DEVICE

(75) Inventors: Andreas Krzoska, Karlsruhe (DE); Gottfried Rieger, Fuerth (DE); Michael Tirpitz, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 10/745,637

(22) Filed: Dec. 29, 2003

(65) Prior Publication Data

US 2004/0182979 A1    Sep. 23, 2004

Related U.S. Application Data

(63) Continuation of application No. PCT/DE02/02203, filed on Jun. 17, 2002.

(30) Foreign Application Priority Data

Jun. 28, 2001   (DE) ............................ 201 10 595 U

(51) Int. Cl.
*A47F 5/00*    (2006.01)
*H05K 5/00*    (2006.01)
*G02F 1/1333*  (2006.01)

(52) U.S. Cl. .................. 248/316.8; 248/562; 349/58; 361/681

(58) Field of Classification Search ........... 248/316.8, 248/27.1, 27.3, 562, 687; 361/681, 685, 361/809; 349/58, 60, 155; 206/521, 521.2, 206/521.5, 586
See application file for complete search history.

(56) References Cited

U.S. PATENT DOCUMENTS 3,781,048 A * 12/1973 Oguma et al. ............... 293/137
5,192,143 A *  3/1993 Lajara et al. ................. 403/24

(Continued)

FOREIGN PATENT DOCUMENTS

DE   694 21 481 T2    3/1995
DE   200 07 364 U1    8/2000
WO   WO90/15359 A1   12/1990

OTHER PUBLICATIONS

"Floating Subassemblies With Impact Absorbing Foam", IBM Technical Disclosure Bulletin, IBM Corp New York, NY, vol. 37, No. 7, Jul. 1994, pp. 187-188.

*Primary Examiner*—Carl D. Friedman
*Assistant Examiner*—Tan Le
(74) *Attorney, Agent, or Firm*—Sughrue Mion, PLLC

(57) ABSTRACT

A retaining device includes bearing units (1111, 1112, 1121 1122) that float-mount a flat screen (2000) and that are preferably each provided with at least one elastic-positioning element (11210) and a vibration damping element (11220). The elastic-positioning element preferably includes a cylinder-shaped hard rubber spacer element (11211). The vibration-damping element (11220) preferably includes a damper with an annular plate-shaped housing and a gel filling (11221). Vibrations and shocks are introduced substantially centrally into the vibration-damping element via a tappet (11224). The retaining device is advantageously used in an electronic display device to float-mount a flat screen, configured e.g. as an LCD display unit, in combination with a touch screen as a contact-sensitive unit.

13 Claims, 2 Drawing Sheets

U.S. PATENT DOCUMENTS

| | | | | |
|---|---|---|---|---|
| 5,363,227 A | * | 11/1994 | Ichikawa et al. | 349/60 |
| 5,379,990 A | * | 1/1995 | Ando et al. | 267/34 |
| 5,394,306 A | * | 2/1995 | Koenck et al. | 361/809 |
| 5,419,626 A | * | 5/1995 | Crockett | 312/7.2 |
| 5,479,285 A | * | 12/1995 | Burke | 349/58 |
| 5,568,357 A | * | 10/1996 | Kochis et al. | 361/681 |
| 5,594,574 A | * | 1/1997 | Lara et al. | 349/58 |
| 5,595,430 A | * | 1/1997 | Weyeneth | 312/319.1 |
| 5,831,816 A | | 11/1998 | Johns et al. | |
| 5,927,699 A | * | 7/1999 | Nakajima et al. | 267/140.14 |
| 5,936,600 A | * | 8/1999 | Ohashi et al. | 345/87 |
| 6,104,451 A | | 8/2000 | Matsuoka et al. | |
| 6,477,042 B1 | * | 11/2002 | Allgeyer et al. | 361/685 |
| 6,496,362 B2 | * | 12/2002 | Osterhout et al. | 361/685 |
| 6,501,644 B1 | * | 12/2002 | Silverman et al. | 361/685 |
| 6,567,265 B1 | * | 5/2003 | Yamamura et al. | 361/685 |
| 6,808,148 B1 | * | 10/2004 | Eakle et al. | 248/309.1 |
| 7,016,189 B2 | * | 3/2006 | Lin | 361/685 |
| 2004/0182979 A1 | * | 9/2004 | Krzoska et al. | 248/316.8 |

* cited by examiner

RETAINING DEVICE FOR THE FLOATING MOUNTING OF A FLAT SCREEN AND ELECTRONIC DISPLAY DEVICE COMPRISING A FLAT SCREEN AND A RETAINING DEVICE

This is a Continuation of International Application PCT/DE02/02203, with an international filing date of Jun. 17, 2002, which was published under PCT Article 21(2) in German, and the disclosure of which is incorporated into this application by reference.

FIELD OF AND BACKGROUND OF THE INVENTION

Flat screens, e.g., LCD monitors, and devices equipped with flat screens have been enabled for portable use. However, problems may arise especially with respect to the mechanical stability of the flat screen. These problems may be further aggravated if the device is used, for example, in an industrial environment, where ambient conditions may be particularly severe. Furthermore, the weight of a display device equipped with a flat screen may be increased by additional components, such as touch sensitive input units, e.g., a touch screen. As a result, the device is more sensitive to shocks and vibrations. Furthermore, particularly a display device equipped with a touch screen may be subject to special mechanical loads under some circumstances. These mechanical loads may include local pressure forces applied, for instance, to the surface of the touch screen, and thus to the flat screen behind it, by users who are inexperienced in the use of the screen.

OBJECTS OF THE INVENTION

One object of the invention is to provide a retaining device and an electronic display device equipped with such a device, which substantially protect flat screens against mechanical loads, especially against vibrations and shocks.

SUMMARY OF THE INVENTION

These and other objects are attained, according to one formulation of the invention, by a retaining device having bearing units configured to float-mount a flat screen, wherein at least one of the bearing units includes at least one elastic-positioning element and at least one vibration-damping element. The invention, according to another formulation, is directed to an electronic display device having a flat screen, and a retaining device that includes bearing units configured to float-mount the flat screen, wherein at least one of the bearing units has at least one elastic-positioning element and at least one vibration-damping element.

The retaining device according to the invention is equipped with bearing units for float-mounting a flat screen. The bearing units have at least one elastic-positioning element and one vibration-damping element. The bearing units of the retaining device according to the invention are thus distinguished by two parallel elements whose mode of action is complementary.

The first element, used for elastic positioning, has the effect that a flat screen supported by a bearing unit according to the invention assumes a predefined position or returns to this position after temporary displacement. Particularly suitable for this purpose are cylindrical elements provided with hard rubber spacer elements. It has been shown, however, that this does not provide effective shock and vibration damping. In exceptional cases, if a flat screen or an electronic display device equipped therewith is exposed to high vibration frequencies, it may even cause resonance factors.

The second element, provided for vibration damping, acts in tandem with the first element and ensures effective absorption of shock and vibration energies in a bearing unit. Particularly suitable for this purpose is a vibration damping element that has a damper with a gel filling. It is furthermore advantageous if this element has an annular tray-shaped housing, into which the vibrations and shocks of the flat screen can be introduced as centrally as possible via a tappet. Such an arrangement ensures damping of vibrations and shocks from almost every spatial direction.

Embodiments of the bearing units according to the invention make it possible to construct a retaining device that is particularly suitable for sensitive flat screens and for electronic display and operating devices that may include other elements in addition to a flat screen, such as a touch screen.

BRIEF DESCRIPTION OF THE DRAWINGS

The invention will now be described in greater detail, by way of example, with reference to the embodiments depicted in the figures in which.

DETAILED DESCRIPTION OF THE PREFERRED EMBODIMENTS

Figure 1:
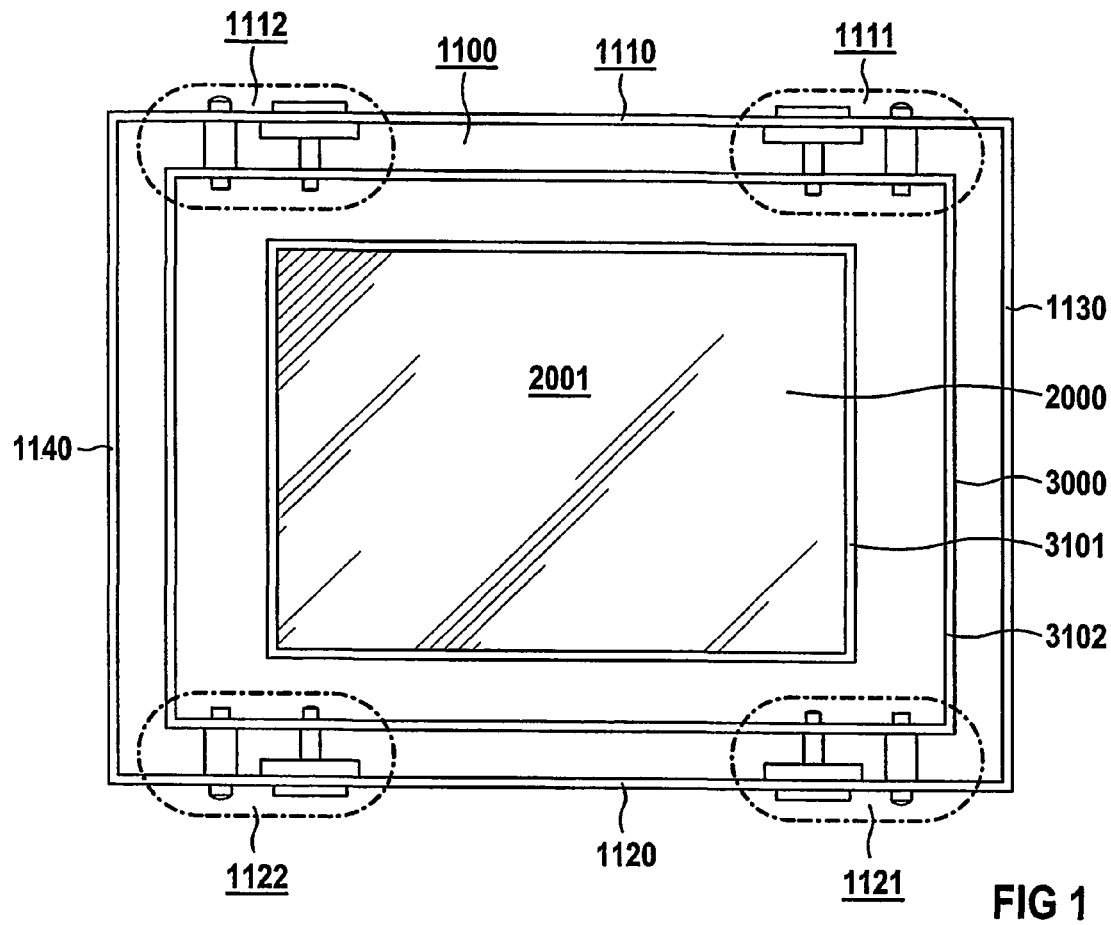
FIG. 1 is a top view of a display device shown by way of example with a first embodiment of a retaining device according to the invention.

FIG. 1, by way of example, shows a top view of a display device with a first embodiment of a retaining device according to the invention. This retaining device has an outer housing frame 1100, which is either mobile or fixed, e.g., mounted in a control panel. Using, for example, four bearing units 1111, 1112, 1121, 1122, an electronic flat screen 2000 is float-mounted in the outer housing frame 1100.

According to a further embodiment shown in FIG. 1, the flat screen is preferably mounted in an additional inner support frame 3000. This support frame preferably has a picture frame-type retaining surface 3101 for the flat screen 2000, which includes a display field 2001 of the flat screen 2000. The bearing units 1111, 1112, 1121, 1122 in the embodiment according to FIG. 1 are thus advantageously arranged between the outer housing frame 1100 and the inner support frame 3000. This makes it possible to float-mount the unit consisting of the support frame 3000 and the flat screen 2000. In the electronic device depicted in FIG. 1, the flat screen 2000 can advantageously be configured as an LCD display unit. In another advantageous embodiment, the flat screen 2000 can be a combination of an electronic display unit and a touch sensitive unit. In this case, the touch sensitive unit is preferably a touch screen.

The retaining surface 3101 of the inner support frame 3000 preferably merges into a circumferential mounting edge 3102. In the example of FIG. 1, the four support units 1111, 1112, 1121, 1122 engage with this mounting edge 3102. The support units 1111, 1112 are arranged on the right and left side of the upper part of the mounting edge, while the support units 1121, 1122 are arranged on the right and left side of the lower part of the mounting edge.

In the embodiment of FIG. 1, the bearing units 1111, 1112, 1121, 1122 are supported against the opposite mounting edges 1110, 1120, 1130, 1140 of the outer housing frame 1100. This makes it possible to obtain a particularly secure float mounting of the flat screen 2000 of the electronic display device. It enables absorption of nearly all vibrations and shocks acting on the flat screen from almost any direction, so that damage to the flat screen is avoided. Advantageously, the bearing units 1111, 1112 are mounted via mechanical recesses in the upper mounting edge 1110 of the outer housing frame 1100, and the bearing units 1121, 1122 are supported via corresponding recesses in the lower mounting edge 1120. Advantageous embodiments of these recesses will be described in greater detail with reference to FIG. 5. Depending on the use of the display devices and especially on the type of the flat screen, additional bearing units may be mounted, if necessary, e.g., in the right and left mounting edge 1130 and 1140 of the outer housing frame 1100. For light arrangements on the other hand, it may be sufficient to position only one bearing unit each approximately in the center of the upper and lower mounting edge 1110 and 1120 of the outer housing frame.

Figure 2:
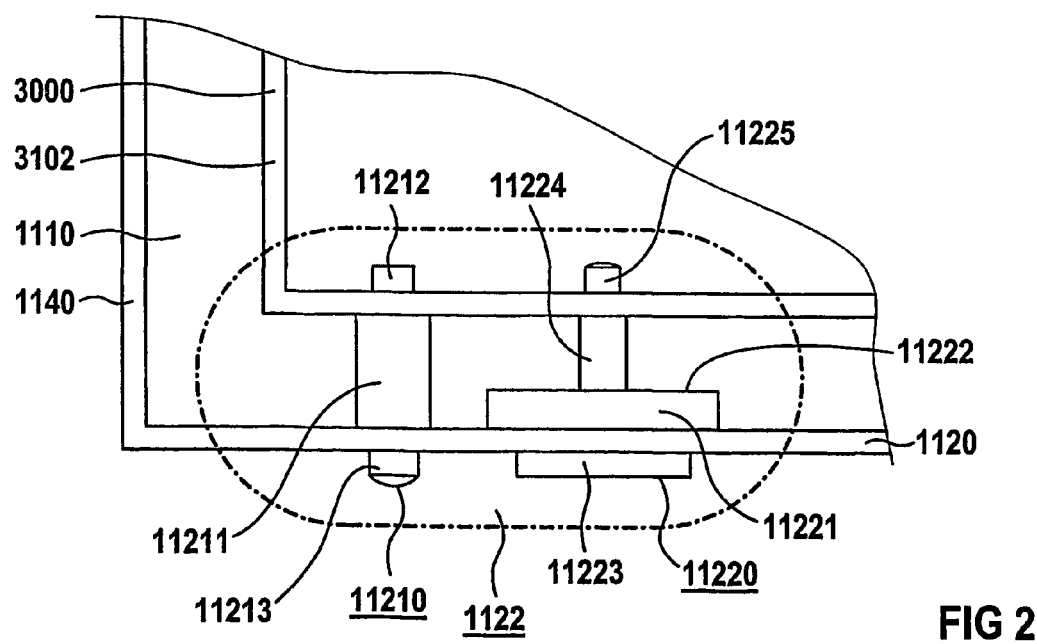
FIG. 2 shows a detail of a bearing unit of the retaining device according to FIG. 1, FIGS. 3a and 3b show a front and a rear view of a preferred embodiment of a vibration-damping element in a bearing unit of the retaining device according to FIG. 2.

FIG. 2 is a detail of the bearing unit 1122, which is arranged at the left lower edge of the retaining device of FIG. 1. According to the invention this bearing unit has at least one elastic-positioning element 11210 and at least one vibration-damping element 11220.

The elastic-positioning element 11210 preferably includes an elastic spacer element 11211, e.g., a cylinder made of hard rubber. This cylinder is supported on the one hand by a retaining bolt 11212 in the lower part of the mounting edge 3102 of the inner support frame 3000. On the other hand a retaining screw 11213 is used to fix the cylinder to the mounting edge 1120 of the outer housing frame 1100.

The vibration-damping element 11220 preferably has a gel damper 11221 with a preferably annular plate-shaped housing. The inner side serves as an active surface 11222, to introduce as centrally as possible vibrations and shocks to which the flat screen or the inner support frame 3000 is exposed. Such forces are particularly advantageously introduced into the active surface 11222 via a tappet 11224. This tappet can be mounted to the support frame 3000 by a retaining screw 11225. The underside of the annular plate-shaped housing advantageously has an additional retaining ring 11223 with a smaller diameter. This retaining ring is placed into a correspondingly configured mechanical recess, preferably provided in the mounting edge 1120 of the housing frame 1100.

Figure 3A:
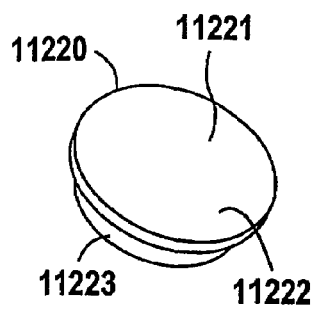
Figure 3B:
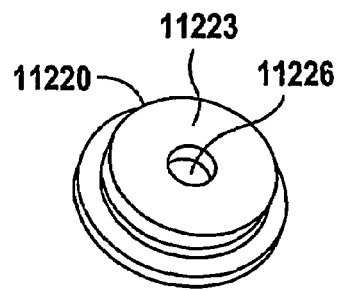

FIGS. 3a and 3b show a front and a rear view, respectively, of a preferred embodiment of a vibration damping element 11220 in a bearing unit of the retaining device depicted in FIG. 2. The annular tray-shaped housing 11221, which is preferably filled with a damping gel, has the active surface 11222 on its upper side. This active surface serves to introduce vibrations and shocks to be dampened. A retaining ring 11123 located on the underside of the annular tray-shaped housing has a smaller diameter and a receiving opening 11126, e.g., to engage with the tappet 11124 depicted in FIG. 2.

Figure 4:
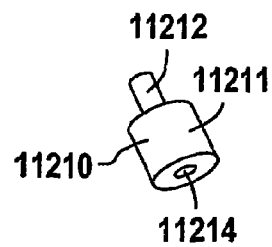
FIG. 4 is a side view of a preferred embodiment of an elastic-positioning element in a bearing unit.

FIG. 4 is a side view of a preferred embodiment of an elastic positioning element 11210 in a bearing unit. In addition to the parts of the element described above with reference to FIG. 2, FIG. 4 shows an internal thread 11214 for the retaining screw 11213, which reaches into the elastic spacer element 11211.

Figure 5:
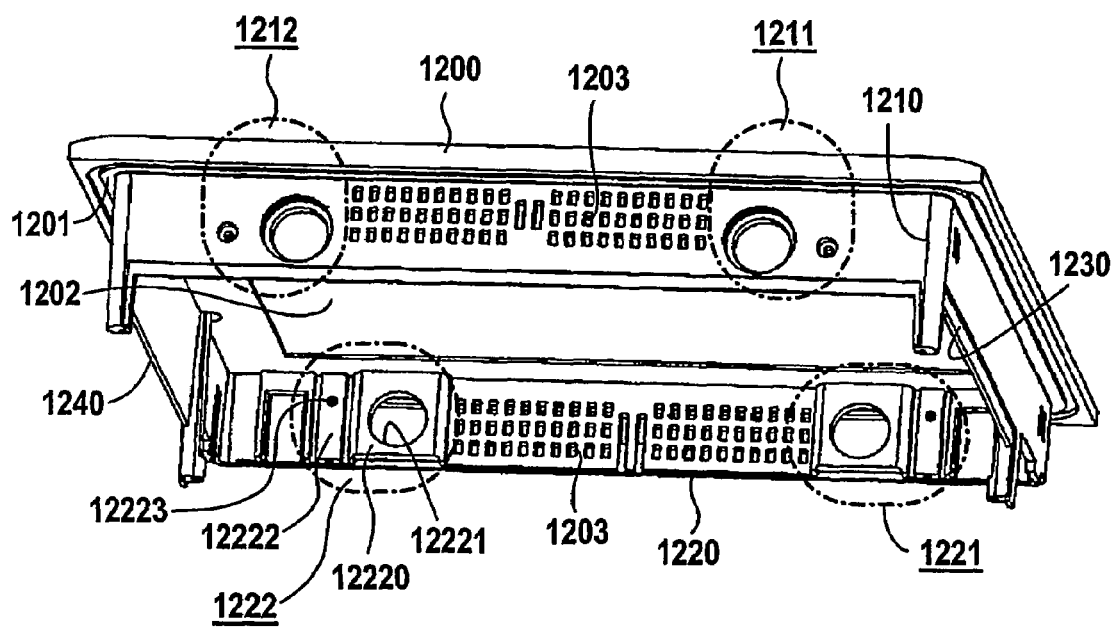
FIG. 5 is a perspective interior view of an outer housing frame of a preferred embodiment of a retaining device according to the invention.

Finally, FIG. 5 shows an outer housing frame 1200 of a preferred embodiment of a retaining device according to the invention in an interior perspective view. This housing frame further has a circumferential supporting edge 1201 from which the mounting edges 1210, 1220, 1230, 1240 proceed inwardly. The supporting edge 1201 delimits a see-through opening 1202 onto the display field of a flat screen that is float-mounted behind it, or a combination of a flat screen and a touch sensitive unit, e.g., a touch screen. Such an arrangement can advantageously be used as a control panel, e.g., in an industrial environment, for instance to control and monitor a technical production process.

The embodiment depicted in FIG. 5 has advantageously configured mechanical recesses 1211, 1212, 1221, 1222 for mounting the elements used for positioning and damping of the individual bearing units. This will now be described in greater detail using the example of the mechanical recess 1222. On the inside of the mounting frame 1220 a retaining bracket 12220 is mounted, which has an insertion recess 12221 for inserting an element 11220 used for damping. The diameter of the insertion recess is adapted to the size of the retaining ring 11223. Adjacent thereto, on the inside of the mounting edge 1220, there is a further retaining bracket 12222, which has an engagement bore 12223 for inserting the retaining bolt 11212 of a positioning element 11210.

Finally, openings 1203 to remove dissipated heat from the interior of the housing frame 1200 are preferably provided in the mounting edges 1210, 1220.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A retaining device comprising:
   bearing units configured to float-mount a flat screen,
   a housing frame having mechanical recesses configured to hold the bearing units, and
   a support frame provided inside the housing frame, the support frame configured to hold the float-mounted flat screen,
   wherein at least one of the bearing units comprises at least one elastic-positioning element and at least one vibration-damping element, and wherein the at least one elastic-positioning element and the at least one vibration-damping element are disposed separate from and adjacent to one another in the at least one bearing unit, and
   wherein the bearing units are connected between the housing frame and the support frame, such that one end of the elastic-positioning element is fixed to the housing frame and another end of the elastic-positioning element is fixed to the support frame, and one end of the vibration-damping element is fixed to the housing frame and another end of the vibration-damping element is fixed to the support frame.

2. The retaining device as claimed in claim 1, wherein the elastic-positioning element comprises an elastic spacer element.

3. The retaining device as claimed in claim 2, wherein the elastic spacer element is cylindrical in shape.

4. The retaining device as claimed in claim 2, wherein the elastic spacer element is made of hard rubber.

5. The retaining device as claimed in claim 1, wherein the vibration-damping element comprises a damper with a gel filling.

6. The retaining device as claimed in claim 1, wherein the vibration-damping element has an annular-plate-shaped housing.

7. The retaining device as claimed in claim 1, further comprising a tappet configured to introduce vibrations or shocks of a flat screen substantially centrally into the vibration-damping element.

8. The retaining device as claimed in claim 1, wherein each of the bearing units comprises at least one elastic-positioning element and at least one vibration-damping element.

9. An electronic display device comprising:
a flat screen; and
a retaining device comprising:
bearing units configured to float-mount the flat screen,
a housing frame having mechanical recesses configured to hold the bearing units, and
a support frame provided inside the housing frame, the support frame configured to hold the float-mounted flat screen,
wherein at least one of the bearing units comprises at least one elastic-positioning element and at least one vibration-damping element, and wherein the at least one elastic-positioning element and the at least one vibration-damping element are disposed separate from and adjacent to one another in the at least one bearing unit, and
wherein the bearing units are connected between the housing frame and the support frame, such that one end of the elastic-positioning element is fixed to the housing frame and another end of the elastic-positioning element is fixed to the support frame, and one end of the vibration-damping element is fixed to the housing flame and another end of the vibration-damping element is fixed to the support frame.

10. The electronic display device as claimed in claim 9, wherein the flat screen comprises an LCD display unit.

11. The electronic display device as claimed in claim 9, wherein the flat screen comprises an electronic display unit and a touch sensitive unit.

12. The electronic display device as claimed in claim 11, wherein the touch sensitive unit comprises a touch screen.

13. The retaining device as claimed in claim 9, wherein each of the bearing units comprises at least one elastic-positioning element and at least one vibration-damping element.

* * * * *